(12) United States Patent
MacLaren et al.

(10) Patent No.: US 11,663,149 B1
(45) Date of Patent: May 30, 2023

(54) SYSTEM AND METHOD FOR MEMORY MANAGEMENT

(71) Applicant: Cadence Design Systems, Inc., San Jose, CA (US)

(72) Inventors: John Michael MacLaren, Austin, TX (US); Thomas Joseph Shepherd, Cedar Park, TX (US); Davika Raghu, Bangalore Karnataka (IN)

(73) Assignee: Cadence Design Systems, Inc., San Jose, CA (US)

( * ) Notice: Subject to any disclaimer, the term of this patent is extended or adjusted under 35 U.S.C. 154(b) by 47 days.

(21) Appl. No.: 17/526,090

(22) Filed: Nov. 15, 2021

(51) Int. Cl.
*G06F 13/16* (2006.01)
*G06F 12/0882* (2016.01)
*G06F 12/0871* (2016.01)
*G06F 12/02* (2006.01)

(52) U.S. Cl.
CPC ...... *G06F 13/1668* (2013.01); *G06F 12/0238* (2013.01); *G06F 12/0871* (2013.01); *G06F 12/0882* (2013.01); *G06F 13/1636* (2013.01)

(58) Field of Classification Search
None
See application file for complete search history.

(56) References Cited

U.S. PATENT DOCUMENTS

2003/0067832 A1* 4/2003 Emmot ............... G11C 8/12
365/230.03

* cited by examiner

*Primary Examiner* — Charles J Choi
(74) *Attorney, Agent, or Firm* — Mark H. Whittenberger; Holland & Knight LLP

(57) ABSTRACT

Embodiments include herein are directed towards a dynamic random access memory system. Embodiments may include a command queue that is configured to hold all commands that are currently selectable for bank operation and execution. Embodiments may further include bank logic operatively connected with the command queue. The bank logic may include a bank management module and a plurality of bank slices, wherein each of the plurality of bank slices is an independent, re-assignable bank tracking module.

20 Claims, 12 Drawing Sheets

202 — storing one or more commands that are currently selectable for bank operation and execution in a command queue

204 — accessing the command queue using bank logic operatively connected with the command queue, wherein the bank logic includes a bank management module and a plurality of bank slices, wherein each of the plurality of bank slices is an independent, re-assignable bank tracking module

FIG. 2

SYSTEM AND METHOD FOR MEMORY MANAGEMENT

FIELD OF THE INVENTION

The present disclosure relates to a system and method of memory management, and more particularly, to a dynamic random access memory ("DRAM") controller configuration.

BACKGROUND

DRAM memory storage is organized in banks, where each bank has many pages. A bank may be opened to one of its pages at a time. Once a page is opened, one or more read and write data transfers may be executed to the page. To open a different page in the same bank, the open page is first closed (precharged) and the bank is re-opened (activated) to the new page, a sequence that may introduce significant delay during which no data is transferred to or from that bank. To hide the overhead of these bank operations, DRAM's may have multiple banks so that while some banks are opening and closing pages, other banks may be transferring data. This function is critical to memory performance which is primarily measured in bus efficiency, the percentage of clocks during which data is being transferred.

DRAM devices have various numbers of banks which operate relatively independently. Over generations of DRAMs, the timings associated with opening and closing pages has increased significantly. In fact, the access times have remained relatively constant measured in nanoseconds (NS), but the clock frequencies have increased such that the same number of NS converts to many more clocks. To maintain bus efficiency at higher clock frequencies, DRAMs may increase the number of banks. The total banks in the system may be determined by the banks per DRAM times the ranks in the system. For large systems, both banks and ranks are increasing to gain performance (e.g., 50 ns from access of a page to access of another page at 3.2 GHz is approximately 100 memory clocks of down time for a single bank).

SUMMARY

In one or more embodiments of the present disclosure, a dynamic random access memory system is provided. The system may include a command queue that may be configured to hold all commands that are currently selectable for bank operation and execution. The system may further include bank logic operatively connected with the command queue. The bank logic may include a bank management module and a plurality of bank slices, wherein each of the plurality of bank slices is an independent, re-assignable bank tracking module.

One or more of the following features may be included. In some embodiments, the plurality of bank slices may be configurable to allow a number of trackable banks to be scaled up or down. A number of the plurality of bank slices may be independent of a number of banks in a memory. A number of the plurality of bank slices may be independent of a number of commands that can be currently executed in a memory controller. The system may include a module configured to swap a page slice from a first bank to a second bank. The system may further include a module configured to swap one or more banks if more banks are requested than are available. The system may also include a module configured to perform conflict resolution. The system may include a module configured to address one or more page closures due to per bank refresh or pre-charge all. The bank management module may manage an allocation and de-allocation of the plurality of bank slices to the plurality of banks. The bank logic may further include an all bank arbiter configured to arbitrate between the plurality of bank slices to determine a command to be executed.

In one or more embodiments of the present disclosure a method for use in a storage system is provided. The method may include storing one or more commands that are currently selectable for bank operation and execution in a command queue. The method may further include accessing the command queue using bank logic operatively connected with the command queue. The bank logic may include a bank management module and a plurality of bank slices, wherein each of the plurality of bank slices is an independent, re-assignable bank tracking module.

One or more of the following features may be included. In some embodiments, the method may include configuring the plurality of bank slices to allow a number of trackable banks to be scaled up or down. In some embodiments, a number of the plurality of bank slices may be independent of a number of banks in a memory. A number of the plurality of bank slices may be independent of a number of commands that can be currently executed in a memory controller. The method may further include swapping a page slice from a first bank to a second bank and/or swapping one or more banks if more banks are requested than are available. The method may also include performing conflict resolution and/or addressing one or more page closures due to per bank refresh or pre-charge all. The method may include managing, via the bank management module, an allocation and de-allocation of the plurality of bank slices to the plurality of banks. The method may further include arbitrating between the plurality of bank slices to determine a command to be executed using an all bank arbiter associated with the bank logic.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is an exemplary flowchart of a storage process according to an embodiment of the present disclosure;

DETAILED DESCRIPTION

Figure 1:
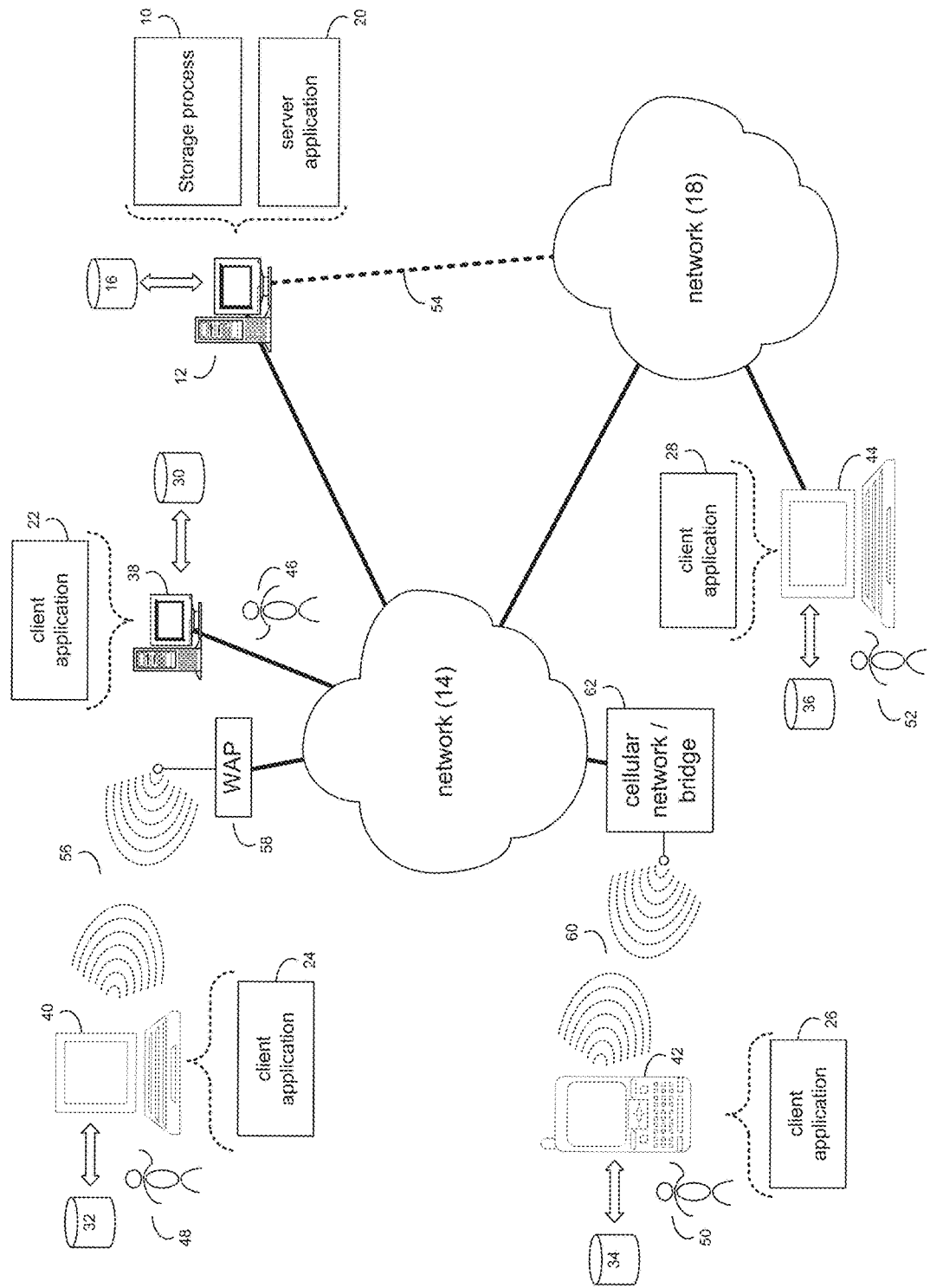
FIG. 1 diagrammatically depicts a storage process coupled to a distributed computing network.

A double data rate ("DDR") controller may include logic to track one or more DRAM bank states. This may be necessary to properly interface with the DRAM device. There are many timing parameters associated with bank operations, for example, the controller must wait for the Row Active Time ("TRAS") timing to be met between an activate and a read or write command. Furthermore, the controller must track the address of the page that is open and, eventually, the precharge timing when the page is closed. Typically the controller does this for however many banks are in the system.

Accordingly, intelligent management of banks is key to memory subsystem performance. To achieve high performance, the memory controller must manage a large number of banks that are being accessed in parallel. Furthermore, to achieve optimal performance, the controller may sort the order of command execution to optimize bank operations. For example, the memory controller may be able to look at 64 commands at a time and execute in any order to achieve best performance.

Command sorting combined with a large number of banks generates a very large interconnect problem which can translate to difficulties in physical implementation. For example, a large logic area, large wire interconnect that can create routing challenges, large signal distribution that requires long wires and significant signal buffering, etc.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown a storage process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, storage process 10 may reside on a client electronic device, such as a personal computer, notebook computer, personal digital assistant, or the like.

The instruction sets and subroutines of storage process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute storage process 10. Examples of client applications 22, 24, 26, 28 may include, but are not limited to, design verification tools such as those available from the assignee of the present disclosure. These applications may also be executed by server computer 12. In some embodiments, storage process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the storage process may be a client-side application (not shown) residing on one or more client electronic devices 38, 40, 42, 44 (e.g., stored on storage devices 30, 32, 34, 36, respectively). As such, the storage process may be a stand-alone application that interfaces with a client application (e.g., client applications 22, 24, 26, 28), or may be an applet/application that is executed within a client application. As such, the storage process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, storage process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

In some systems, the number of total banks across the DRAM's may be very large. Managing and tracking all of the banks becomes impractical. For example, a DDR5 system with 4 ranks and 32-banks per DRAM would have 128 banks, which is more banks than is necessary to have in use at one time to achieve performance objectives. With memory stacks of up to 32 logical ranks, the number of banks can be much higher. Moreover, with a large number of parallel commands for execution (e.g., 64), each can be to any bank (e.g., 128), the interconnect of every bank to every command (e.g., 32 wires per interface) may become huge (e.g., 262K wires), resulting in routing congestion problems that hinder physical design and timing closure. Large interconnects and large numbers of banks to track also generates excessive area requirements (e.g., large numbers of gates) and reducing the interconnect may require managing less commands, which may reduce performance or reduce system memory capacity, etc.

Accordingly, embodiments of storage process 10 may include bank logic that may utilize a plurality of bank slices to track individual banks and the number of bank slices may be configurable to allow for sizing of the bank logic. In some cases, the bank slices may be interconnect independent from the number of banks in the memory system and independent from the depth of the command queue.

Referring now to FIG. 2, a flowchart depicting an embodiment consistent with storage process 10 is provided. Embodiments may include storing 202 one or more commands that are currently selectable for bank operation and execution in a command queue. Embodiments may further include accessing 204 the command queue using bank logic operatively connected with the command queue, wherein the bank logic includes a bank management module and a plurality of bank slices, wherein each of the plurality of bank slices is an independent, re-assignable bank tracking module. Numerous other operations are also within the scope of the present disclosure.

Figure 3:
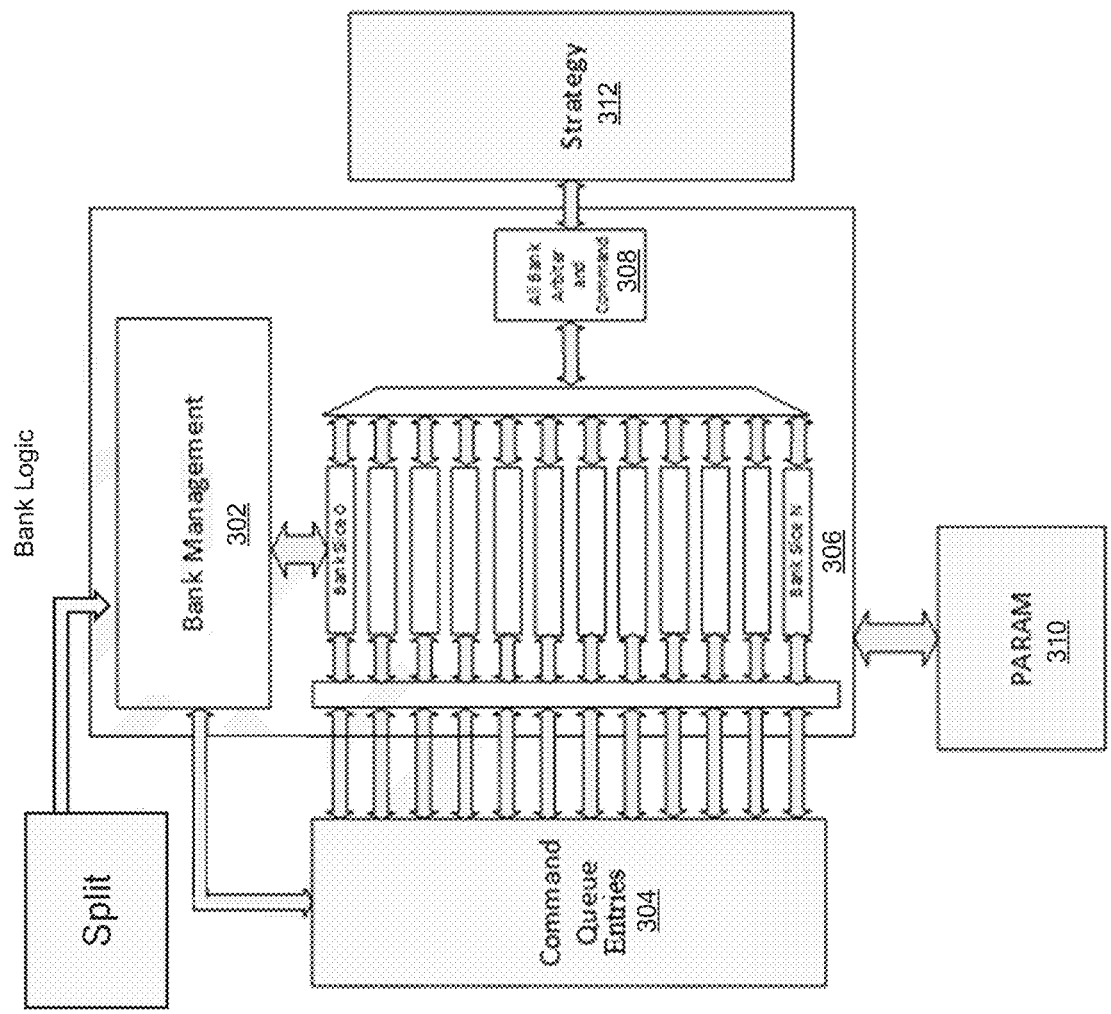
FIG. 3 is a diagram showing an example of bank logic associated with a storage process according to an embodiment of the present disclosure.
Figure 4:
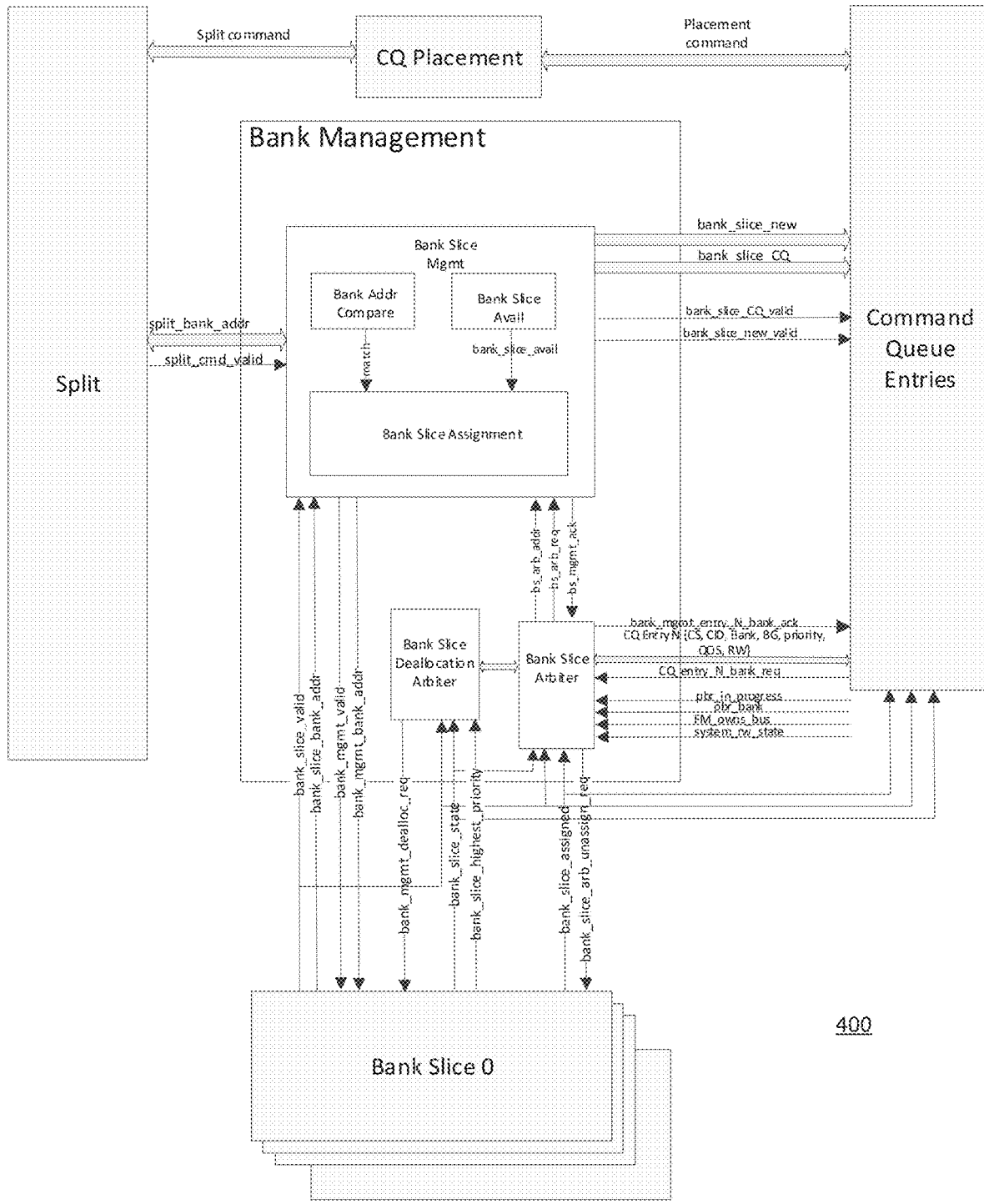
FIG. 4 is a diagram showing an example of a bank management module associated with a storage process according to an embodiment of the present disclosure.

Referring now to FIGS. 3-12, numerous figures consistent with embodiments of storage process 10 are provided. FIG. 3 depicts an example showing bank logic 300 that includes bank management 302, a command queue 304, a plurality of bank slices 306, an all bank arbiter 308, one or more input parameters 310, and associated strategy module 312. FIG. 4 depicts an example showing a block diagram 400 showing bank management in further detail. In some embodiments, the process may utilize more slices than command queue entries for an open page policy, which is discussed in further detail hereinbelow.

In some embodiments, bank logic 300 may utilize one or more bank slices 306. Here, each bank slice 306 may be assigned to any one bank and may be reassigned to any other bank when the current bank is closed. The number of bank slices in a controller may be configurable to allow the number of trackable banks to be scaled up or down according to the system goals. The number of bank slices may be independent of the number of banks in memory and independent of the number of commands that may be currently executable in the memory controller. In some embodiments, the number of bank slices may be greater than or less than the number of commands in the command queue. In some use cases, the number of bank slices may be configured to be greater than the number of commands in the command queue. This will allow additional banks to be tracked and left in its open state (even though no commands are currently pending to it). Because the bank is open, any future commands targeting that bank can be immediately executed since the bank is open, referred to herein as an open page policy.

Bank logic 300 and the teachings of the present disclosure provide numerous advantages over existing approaches. Some of these include, but are not limited to, the bank logic and interconnect may be independently scalable from other system resources, the bank logic may achieve the same performance while reducing various physical aspects including area, wire congestion, etc.

In some embodiments, the use of bank slices 306 or independent, re-assignable bank tracking modules may create many unique implementation challenges that require novel solutions, as is discussed in further detail hereinbelow. For example, storage process 10 may include one or more techniques for swapping a page slice from one bank to another. Storage process 10 may further include approaches for bank swapping under various conditions when more banks are requested than bank slices available. Storage process 10 may also include various techniques for dealing with conflicts, which may hurt performance or hang the system as well as various approaches for dealing with page closures due to Per Bank Refresh or Precharge All and how banks are either maintained or reassigned under these conditions. Some commands, such as a Per Bank Refresh, require a bank to be closed for some time for the refresh, during this time the bank logic may remain assigned to the bank while it is in the closed state and may reopen when the refresh is complete or it may be reassigned to another bank that is ready to execute while the other bank is offline being refreshed.

In some embodiments, if all of the bank slices are full, and if there are commands in the command queue not yet assigned a bank slice ready for execution, the bank slices that are in the open page policy (with no commands pending to its bank) may be deallocated first. As discussed above, bank slices undergoing a Per Bank Refresh may not be executed, and may be reassigned if another command needs a bank slice. In some embodiments, (with fewer bank slices than command queue), all of the bank slices may only contain commands with address conflicts which means those commands cannot be executed. If there is a command without a bank slice and without a conflict inside the command queue, the bank deallocation will swap out the conflict command and reassign to the no-conflict command.

In some embodiments, storage process 10 may be configured to manage all banks and/or to set a maximum number of banks for a system that has both ranks and stacks. Essentially these may include two dimensions (e.g., height and width) but within the total, the maximum required is a subset such that the customer may define a limit. For example, if the customer defines 8 ranks and 32 high stacks and a maximum of 32 total ranks then they may select a 1-32 high stack, 2-16 high stacks, 4-8 high stacks, etc.

In some embodiments, and referring again to FIG. 3, bank logic 300 may include multiple components, including, but not limited to, bank management 302, bank tracking (shown in FIG. 11), and bank arbitration and command 308. Bank management logic 302 may be configured to manage the allocation and deallocation of the bank slices to the operative banks. Initially, bank management logic 302 may be configured to manage placing a command in command queue 304. Command queue 304 may include the queue holding all of the commands that are currently selectable for bank operations and execution. As previously discussed, command queue 304 may allow up to any number of commands (e.g. 64, etc.) to be reorganized for optimized order of execution. When a new command is placed in command queue 304, it may (a) target a bank slice already allocated a bank slice for a previous command, (b) target a bank not allocated a slice and a slice is allocated, or (c) target a bank not allocated a slice and no slice may be allocated. In the non-allocated case, generally a slice may be allocated if one is available and no command queue entries are currently waiting to be assigned a bank slice. But if any command queue entries are waiting for a bank slice, new commands may be placed in command queue 304 and must arbitrate for a bank slice from plurality of bank slices 306.

In some embodiments, when there are more commands in command queue 304 than bank slices 306 and if those commands are targeting different banks such that not all command target banks may have a bank slice assigned, then there may be some command queue entries without a bank slice assigned. These command queue entries may request a bank slice from bank management logic 302 which may arbitrate between all bank requests and allocate bank slices based on the arbitration algorithm.

In some embodiments, all of the bank slices may be allocated and bank management logic 302 may determine that a bank slice must be released to service a pending request. In this condition the bank slice may utilize the bank deallocation algorithm to determine which bank to release and executes a bank deallocation sequence.

In some embodiments, special logic may be included for events that close the banks for several or all banks. For example, a per bank refresh may close one or more banks in all ranks. And an all bank refresh may close all banks. In some embodiments, the bank slice may remain assigned to the bank but may be reassigned based on the bank management algorithm.

In some embodiments, the bank tracking logic may be configured to track the state of the bank slice. Various bank slice state transitions may be supported. A table may be employed to summarize the transition matrix that achieves performance goals and prevents state transition loops that could hinder performance or even cause lock up conditions.

In some embodiments, bank arbitration and command logic 308 may arbitrate between the commands in command queue 304 assigned to a bank slice to determine bank operations. The bank arbitration may include multiple levels of arbiters, for example, single bank arbiters, all bank arbiters, etc.

In some embodiments, the single bank arbiter may be configured to review every command in the command queue that is targeting the bank assigned to the bank slice and, based on the current state of the bank (e.g., open, closed, or in transition), may determine the next operation. Some unique algorithms may be employed. For example, the efficiency logic may utilize a programmable efficiency counter to maintain the bank in an open state, without regard to command priority, when more commands are to the same open bank to facilitate getting the maximum number of commands to the open page and highest bus efficiency; eventually, when the counter expires, priority may allow higher priority commands to close the page. All bank arbiter 308 may arbitrate between all of the bank slices to determine the one command to be executed.

For example, consider a DDR5 system with 4 ranks, a 64-deep command queue, and 32 bank slices. Each rank of DDR5 DRAM 32-banks, so the total number of banks in the system is 128. The command queue has capacity of 64 commands, so the number of operative banks is 64 since each command queue entry can only target a single bank. There are 32 bank slices limiting the number of banks being accessed to 32. The smaller number of bank slices than command queue entries means that some commands may be in the command queue without a bank slice assigned. The advantage of having less bank slices than command queue entries is that it may significantly reduce the interconnect and gate area (there are many timers/counters logic associated with each bank tracked) and allow higher frequency operation and may not hinder bank availability.

Figure 5:
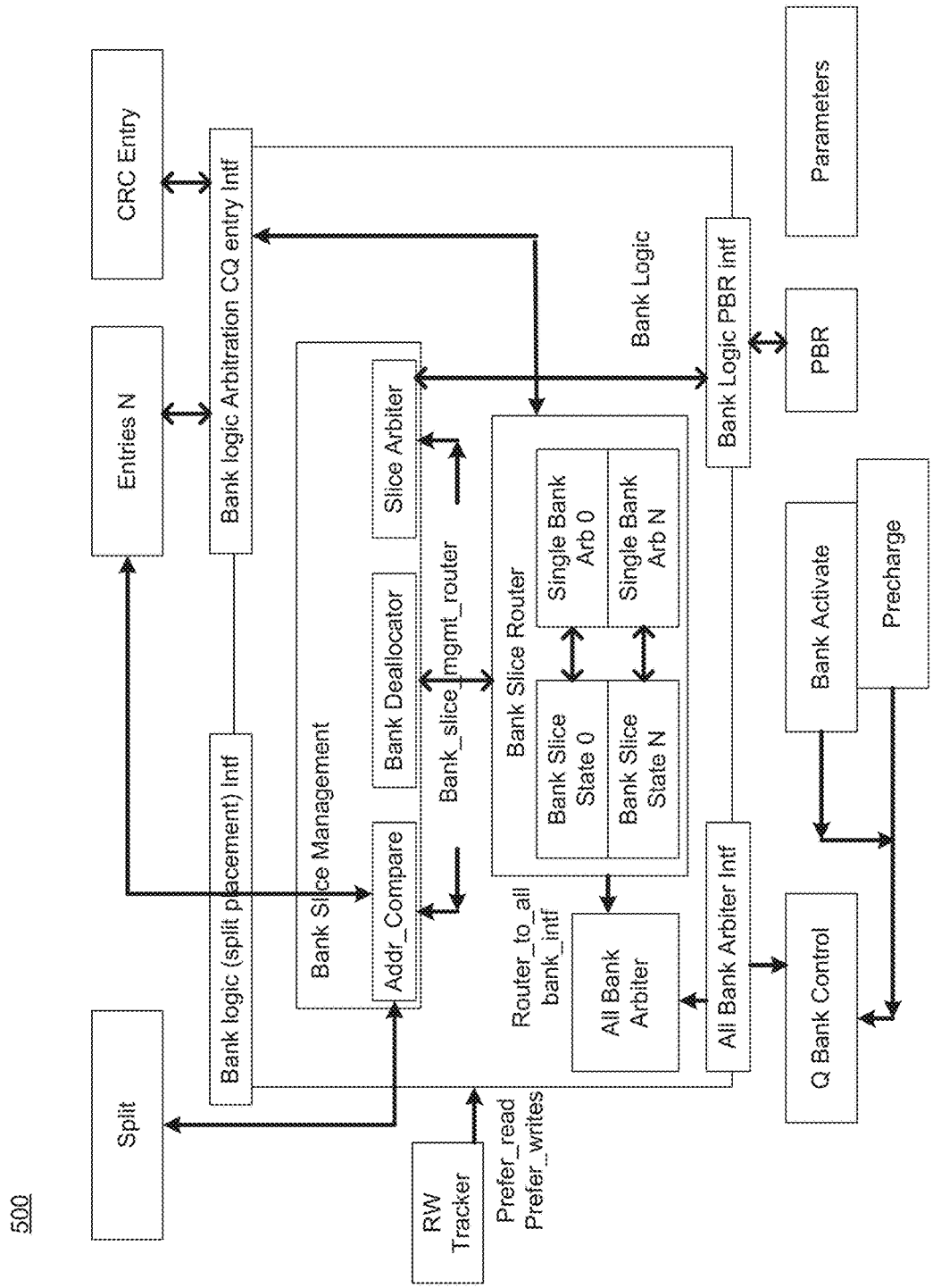
FIG. 5 is a diagram showing an example of bank logic associated with a storage process according to an embodiment of the present disclosure.

Referring now to FIG. 5, a diagram 500 showing a block level hierarchy consistent with embodiments of storage process 10 is provided. In some embodiments, storage process 10 may be configured to perform bank slice assignment (e.g., during placement). In operation, when a split command is placed into the command queue, a bank slice may be assigned to the new entry if a bank slice is currently available and no command queue entries are requesting a bank slice, or if the target bank is already assigned to an existing bank slice, or if the target bank matches the winning command queue entry request on same cycle as new split command is being placed.

In some embodiments, the bank management logic may be configured to assign the split command's bank address to a bank slice at placement and the encoded one hot bank slice identification number (e.g., bank mgmt bank slice one hot) may be sent with the split command to the command queue entry.

In some embodiments, storage process 10 may utilize one or more bank slice arbitration rules (e.g., for unassigned command queue entries). The bank slice arbiter, as shown in FIG. 4, may arbitrate between command queue entries based upon no conflicts, bank address (e.g., avoid picking an entry whose bank is currently in per bank refresh), preferred command type, state (command type), priority, command queue order, etc.

In some embodiments, and referring again to FIGS. 4-5, storage process 10 may be configured to perform bank slice deallocation. The bank logic may generally be configured with less bank slices than command queue entries or with more bank slices than command queue entries as the open page policy may be used. This may create a scenario where all bank slices may be assigned to banks for commands in the command queue and other command queue command entries targeting other banks do not have a bank slice assigned and cannot execute bank operations until a bank slice is assigned.

In some embodiments, bank slices may remain tied up with currently assigned banks stalling commands to other banks to the detriment of memory system performance criteria. For example, one or more commands could experience excessive delay, high priority commands could have longer than expected latency, and the system could even reach a lockup state where some commands are delayed indefinitely.

In some embodiments, to prevent these scenarios, the bank logic may include logic to deallocate bank slices from currently assigned banks under certain conditions to allow the bank slices to be assigned by the bank slice arbiter to other banks that are waiting. Some examples may include open page policy and no commands pending, bank slices in IDLE assigned state due to per bank refresh, bank slices with conflicts (e.g., if there is a command queue entry without a conflict), and/or all entries have conflicts except Entry 0 (but Entry 0 is not assigned a bank slice)—this may occur with placement enabled placing new commands closer to the top of the queue then previous commands.

Figure 6:
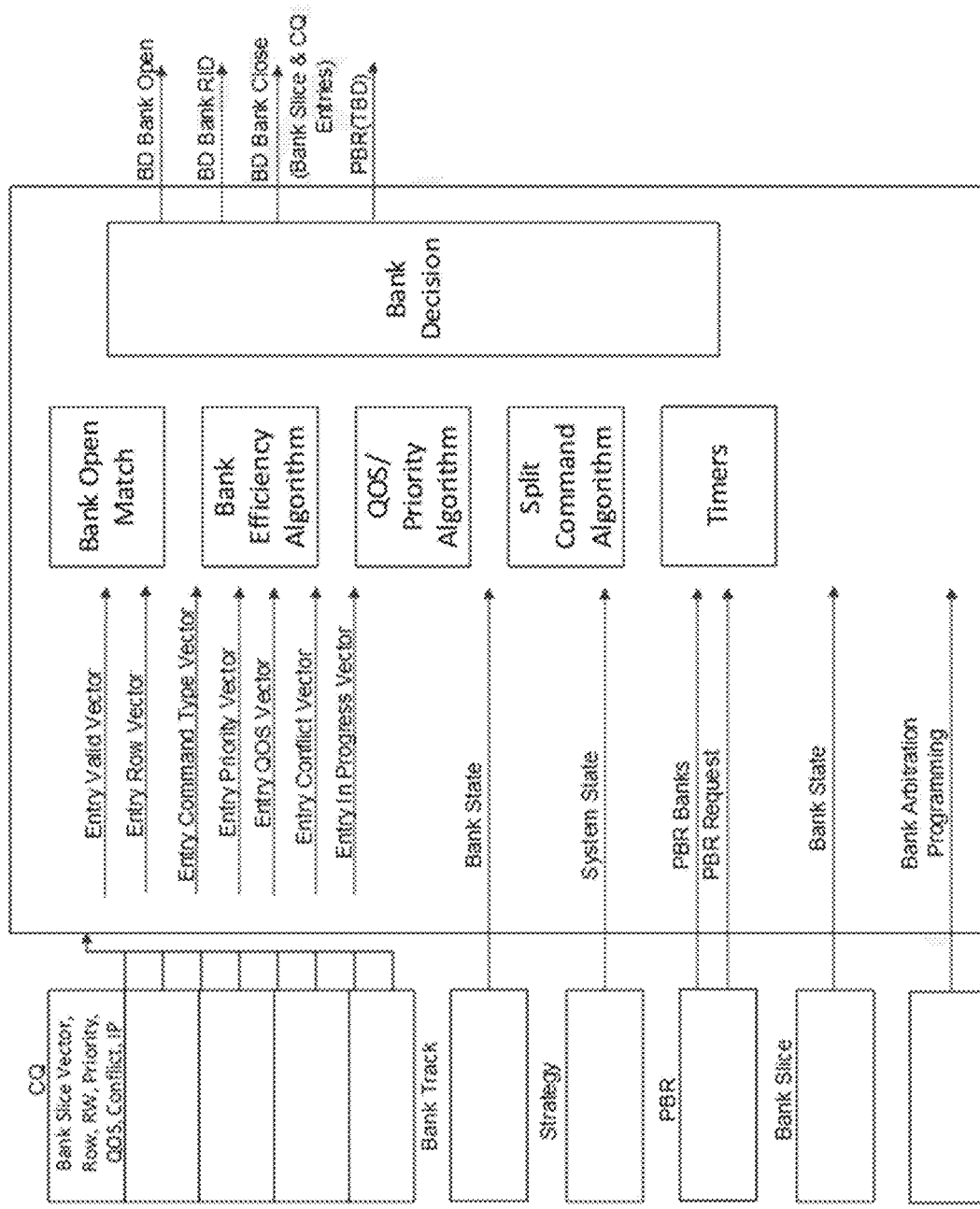
FIG. 6 is a diagram showing an example of a bank arbiter associated with a storage process according to an embodiment of the present disclosure.
Figure 7:
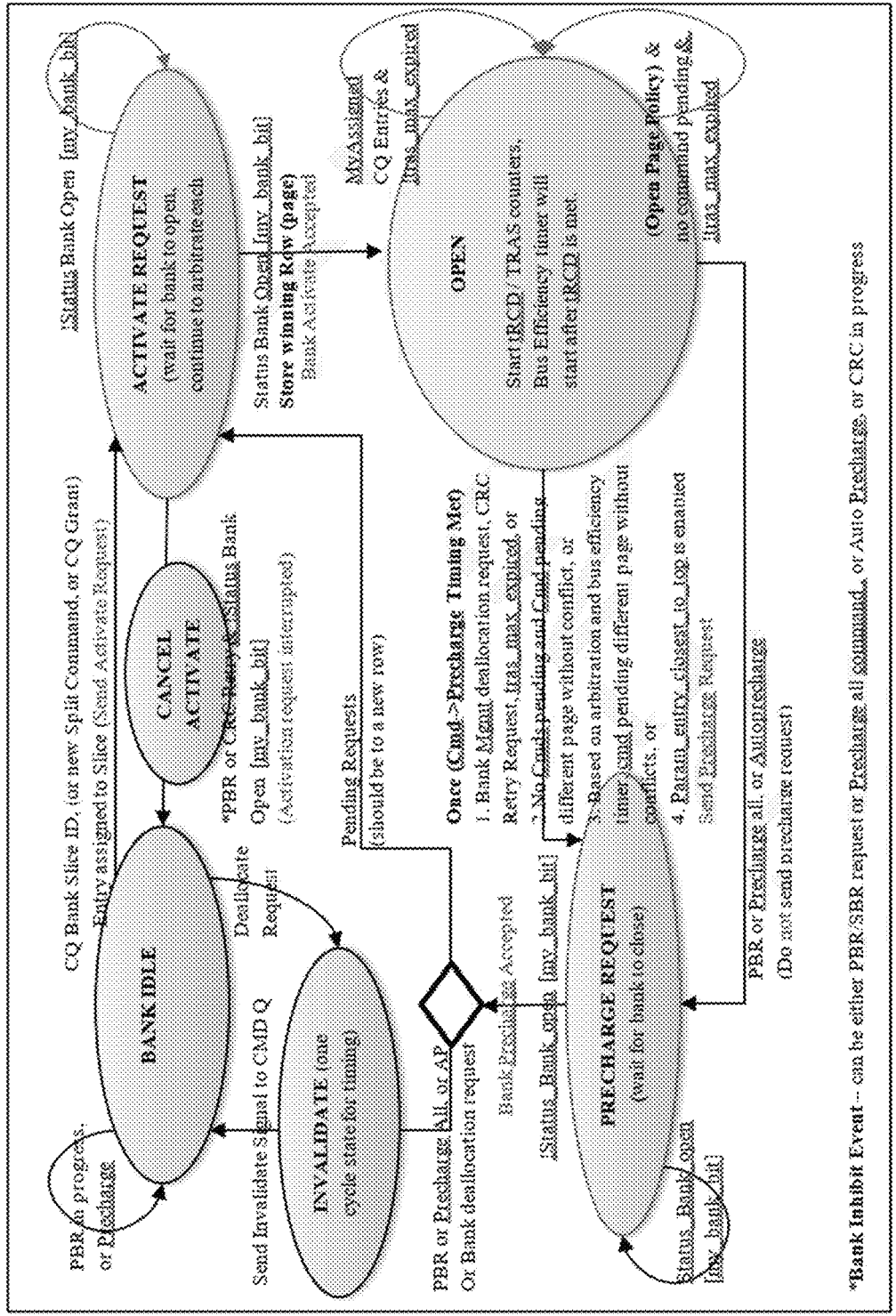
FIG. 7 is a bank slice state diagram associated with a storage process according to an embodiment of the present disclosure.

Referring now to FIGS. 6-7, a diagram 600 showing an example of a single bank arbiter and bank slice finite state machine 700 are provided. In some embodiments, the single bank arbiter (stage 1) arbitration is arbitration between commands targeting a single bank. There may be one arbiter per bank slice and the arbiter may have visibility of all commands in the command queue that target its bank. The following fields may be available, but are not limited to, Row, RW, Priority/QOS, Valid, Entry Conflict bit and In-Progress Bit. In-Progress refers to a command in a multi-command sequence where at least one of the commands in the sequence has already been executed and, therefore, the other commands in that sequence are given higher priority to prevent tying up resources for a partially executed command.

In some embodiments, the single bank arbiter understands command ordering (e.g., based on command queue ordering), bank state tracker, and read or write prioritization from the RW Tracker. RW tracker is logic that determines when to switch between executing reads and executing writes, generally performance is better when running reads and writes in groups due to timing overhead of switching back and forth between reads and writes. In the bank slice IDLE state, the arbiter may be configured to evaluate which page to activate. In the bank slice OPEN state, the arbiter may evaluate when a precharge should be issued.

In some embodiments, the single bank arbiter may utilize various algorithms to determine what action (if any) may be required for the designated bank based on the commands in the command queue to the bank and other applicable state information. The arbiter may evaluate information relative to the bank state to determine what, if any, bank operation should be executed for the bank. Based on the information provided and the programmed options, the arbiter may determine if any bank actions are required.

In some embodiments, there are several arbitration objectives which may be applied in different orders according to the system objectives. Some of these objectives may include, but are not limited to, maximizing the commands executed to an open page (BUS EFFICIENCY), minimizing read/write bus turn-arounds, minimizing latency for higher priority commands, achieving priority/QOS objectives, limiting latency for additional commands in a command sequence which is already in progress, prioritizing commands based on order of entry to the command queue, preventing excessive command lock-out, continuous reads blocking writes, continuous writes blocking reads, high priority commands blocking lower priority commands, continuous page hits blocking commands to another page, continuous page hits blocking commands to another bank (when bank slices <command queue entries), command with conflict blocking other commands to the same bank different page, resolving priority inheritance, managing banks intelligently for per bank refresh (other refresh algorithms), managing banks intelligently for framework management ("FM") commands (e.g., precharge all), preventing opening a bank and closing without execution of any commands, open a bank with multiple pages before a bank with a single page to hide the latency of page operations. FM refers to logic that may handle most of the non-data traffic like refresh, mode register reads and writes, BIST, etc.

In some embodiments, storage process 10 may maximize the commands executed to an open page. Accordingly, storage process 10 may be configured to keep the bank open when additional commands to the same page are present, which may depend on command type match. This rule may be limited by the MAX_SAME_PAGE_CMD_CNT_HIGH when commands to another page to the same bank a separate counter is provided for higher priority and may account other factors including entry location and when the command to another page arrives.

In some embodiments, storage process 10 may minimize read/write bus turn-arounds, prevent continuous reads blocking writes and continuous writes blocking reads, etc. Accordingly, storage process 10 may include the command type and current command execution state in determination if an open bank should remain open or close; open the bank according to matching the command type. This rule may be limited by the MAX_CONSECUTIVE_RD_COUNTER and the MAX_CONSECUTIVE_WR_COUNTER. Furthermore, a state machine may track read/write transitions to optimize bank state transitions based on current read/write preference; see RW Tracker.

In some embodiments, storage process 10 may minimize latency for higher priority commands and/or prevent higher priority commands from locking out lower priority commands. Accordingly, storage process 10 may close the bank if a higher priority command targets a different page; open the bank to the lowest entry (closest to strategy) within the highest priority group. A priority escalation scheme may be required to prevent locking out lower priority commands (for example, a low priority read on top, with high priority write to same location (therefore a conflict on the write). The lower priority read command needs priority escalation. This may be handled with the age counter inside the command queue entry itself.

In some embodiments, storage process 10 may limit latency for commands in a command sequence which is already in progress. Accordingly, storage process 10 may utilize one or more command sequences that span multiple banks, such as burst sequences with BG rotation, priority is given to commands in the sequence once the sequence is started; either to keep the bank open or to transition the bank as required by the sequence.

In some embodiments, storage process 10 may prioritize commands based on an order of entry to the command queue. Storage process 10 may open the bank based on the lowest entry in the command queue targeting the bank (closest to strategy).

In some embodiments, storage process 10 may be configured to maximize the commands executed to an open page by maintaining an open page policy. When Auto Precharge is not enabled, a bank may maintain an open page until a command to a different page, same bank is queued in the command queue or TRAS MAX is reached. If MIN BANK SLICES AVAIL is non-ZERO, bank slices that are open without any commands will be closed.

In some embodiments, storage process 10 may be configured to prevent opening a page or keeping a page open for a command with an ordering conflict. Accordingly, if a command is blocked by a conflict; the bank should not stay open or open to a page based on the blocked command only as this may result in a lock-up or stall.

In some embodiments, storage process 10 may be configured to close a bank and to not open a bank that is selected for per bank refresh. Accordingly, per bank refresh, or another limited refresh scheme, may choose one or more banks for refresh; once selected, the bank should remain closed or be closed in support of the per bank refresh operation. This assumes that the per bank refresh logic is intelligently selecting the target bank.

In some embodiments, storage process 10 may be configured to not open a bank when an FM command is eminent. Many FM commands may execute a Precharge All which may close all banks. Do not open a bank if the FM command will be executed before the target command can be executed. In some embodiments, an FM command may take over the control bus as needed. The bank logic may monitor for the precharge all to determine if any FM tasks closed a bank.

In some embodiments, storage process 10 may be configured to not open a bank without executing any commands. In this way, if a bank is opened, the process may execute at least one command before closing the bank if a conflicting requirement indicates to close the bank.

Referring again to FIG. 7, a bank slice state finite state machine diagram 700 is provided. As shown in the Figure, some of the states may include BANK IDLE, ACTIVATE REQUEST, CANCEL_ACTIVATE, OPEN, PRECHARGE REQUEST, and INVALIDATE. For BANK IDLE, this may include an unassigned or assigned flag. If unassigned, the bank slice is in idle state, and it is available to be assigned to a bank in the system. The previously assigned bank has been closed, and this bank slice may not be associated with any physical bank in the system. The bank slice may transition to activate request when there is a new split command assigned to it, or a new command queue grant assigned to it. If assigned, the bank slice is in idle state, but it is currently still assigned to a bank in the system. This may occur when a bank slice was interrupted by a PBR/SBR, precharge all, or auto-precharge event, or CRC retry. CRC Retry refers to a feature where a command gets a CRC error and the commands are stopped and the previously executed commands may be replayed from a command storage queue. These commands may require bank operations to execute and must be given priority. The associated system bank may be currently closed and an activate request is not yet being asserted (due to the PBR event, etc.). In this assigned idle state, the bank slice may be reassigned by the Bank Deallocator (see Bank Slice Deallocation). If a deallocate request occurs, the finite state machine may transition to the invalidate state and then back to idle unassigned state. Or, the bank slice may also transition to activate request once the event (PBR, AP) is no longer needed. When a bank is closed for a refresh (for example), the bank slice may generally stay assigned to the bank; but another bank may be ready to executed commands; so the deallocation logic takes the bank away from the current bank that is in idle and refreshing, and reassigns to the bank that is ready. For ACTIVATE REQUEST, once an entry is assigned to a bank slice, the bank slice will transition from IDLE to BANK_ACTIVATE_REQUEST (assuming no PBR or precharge all, or AP, or CRC retry). The bank slice activate request is sent to the Stage 2 All Bank Arbiter. If the bank slice request is granted, the bank activate command is sent to the control module and the status banks open vector [my_bit] will indicate the controller issued a bank activate command to memory. If the bank slice activate request is still pending (the status bank open bit is not yet open), the bank activation request can be cancelled by a PBR request, or precharge all, or AP. In these cases, the bank slice will return to the IDLE assigned state. For CANCEL_ACTIVATE, if there is a PBR event or a CRC retry event in the activate state, then due to the pipeline stages in the all bank arbiter, this state is required before we can cancel the activate request and return to idle. If the my_status_banks_open is 1, then transition to OPEN state, but if my status_banks_open=0, then it is ok to transition back to IDLE. For OPEN, it may include either CMDS_PENDING or NO_CMD_PENDING (OPEN PAGE POLICY). CMDS_PENDING indicates this state is reached once the bank activate has been issued to memory. After the TRCD timing has been met, the bank is considered open and the bus efficiency timers will start counting. In this state, generally the initiating command will always be executed before closing the page to open to another page. The page may be closed without executing the initiating command; this should be prevented except when the command cannot be executed and a high priority request, such as a PBR occurs. In this state, other commands to the same page will be executed, even if other commands to the same bank, different page are ahead or higher priority, until the bus efficiency timer has been reached. This state is exited when the bus efficiency timer expires and a higher priority command exists, or if all commands to the bank are complete, or if a precharge is requested by a PBR request, or the bank is closed by a precharge (such as a precharge-all when FM owns the DFI bus). Alternatively, for NO_CMD_PENDING; The bank is active, no commands to the bank are pending. This state is only applicable when open page policy is enabled. This state is reached when all of the commands to the bank are complete, the bank may remain open for a future command to be placed targeting the open page. The bank slice will remain in this state while the bank arbiter does not close the page for another command, the bank deallocation arbiter does not close the page to make available to another command, and no commands to the page hit the page. For PRECHARGE REQUEST, the bank precharge request is in progress. Entering this state, the bank precharge request is sent to the Stage 2 All Bank Arbiter. If the request is granted, the status banksopen vector [my_bit] will close indicating the bank precharge comma nd is sent to the memory. For INVALIDATE, this is a 1 cycle state that is always entered when a bank slice has finished precharge request. In this state, if there are still command queue entries assigned to this bank slice and if the bank deallocator module has sent a deallocate request, then a 1 cycle 'invalidate' pulse will be sent to all the entries along with the bank slice number.

Figure 8:
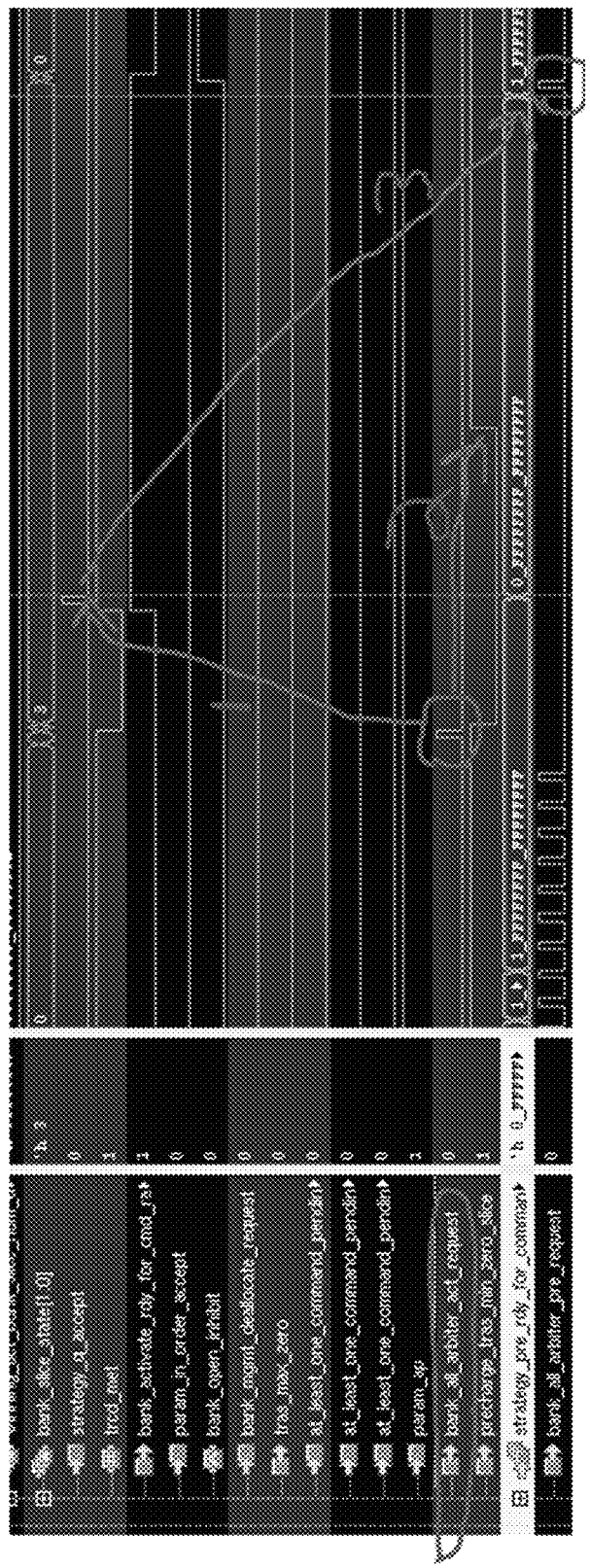
FIG. 8 is a timing diagram associated with a storage process according to an embodiment of the present disclosure.
Figure 9:
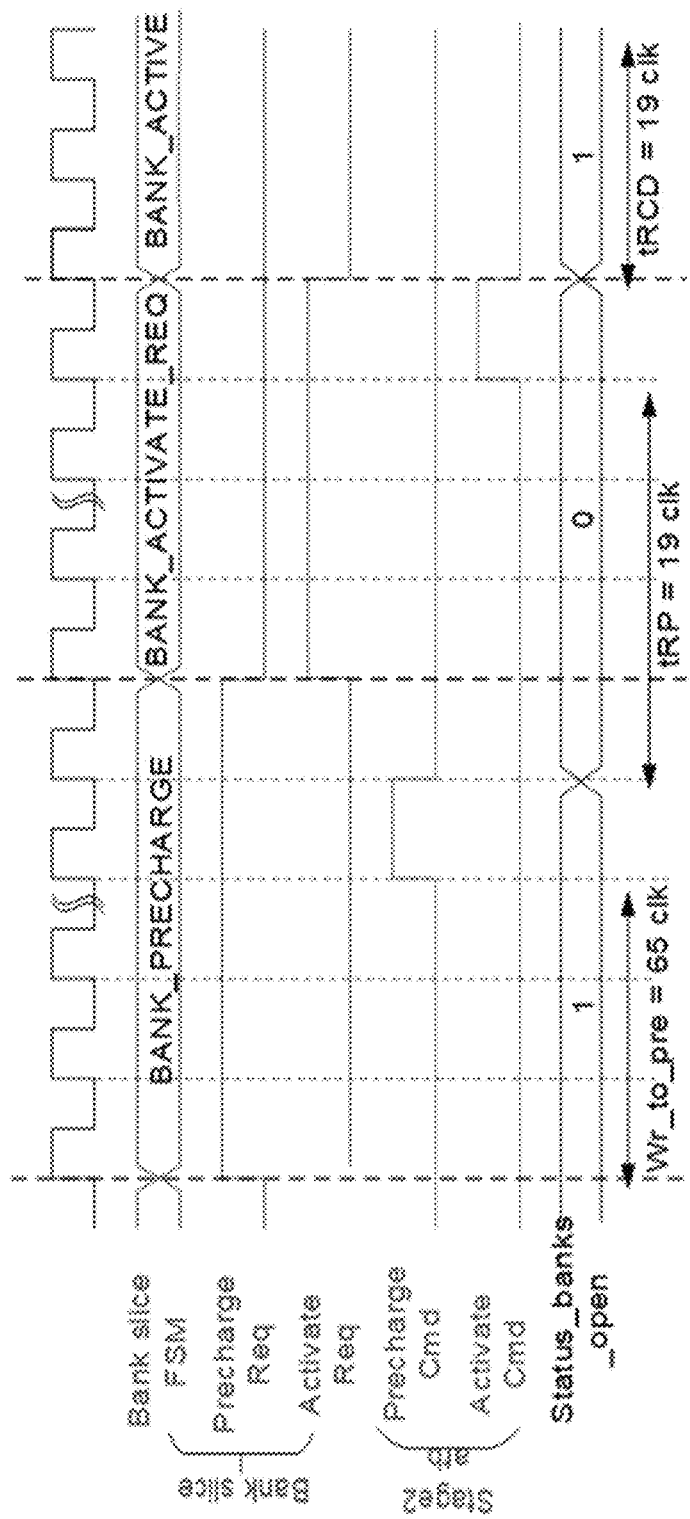
FIG. 9 is a timing diagram associated with a storage process according to an embodiment of the present disclosure.

Referring now to FIG. 8 a timing diagram 800 showing an example of activate to precharge is displayed. In this example, "TRCD_met" (shown as #1) depicts from the activate request to the time strategy can accept the command. "TRAS min" (shown as #2) depicts the minimum time from activate to precharge request. "Strategy_pre_rdy_for command" (shown as #3) depicts the timing from control read/write issued to a precharge request. Alternatively, FIG. 9 shows a timing diagram 900 depicting an example of precharge to activate is displayed.

In some embodiments, storage process 10 may include a second stage all bank arbiter. The stage 2 arbitration rules may be similar to the stage 1 arbiter, but with multipage request consideration. In some embodiments, the all bank arbiter may select in progress slice requests (that may be treated with highest priority), may select bank slice requests that match the system RW tracker (if enabled), may select highest priority over lower priority (if enabled), may select bank slices requests with multiple same page requests over single page requests, and/or may select based on highest command queue ordering (e.g., closest to top).

In some embodiments, storage process 10 may include one or more arbitration rules for breaking ties. For example, if activation and precharge request occur on same cycle, the arbitration could be configured to allow the activation to always win, or the entry closest to top would win (could be either activate or precharge). A SBP/PBR precharge will always win over a normal precharge, a TRAS_MAX precharge will win over a normal precharge, and a CRC bank slice will always win over a normal bank slice (since the other slices go to idle first).

Figure 10:
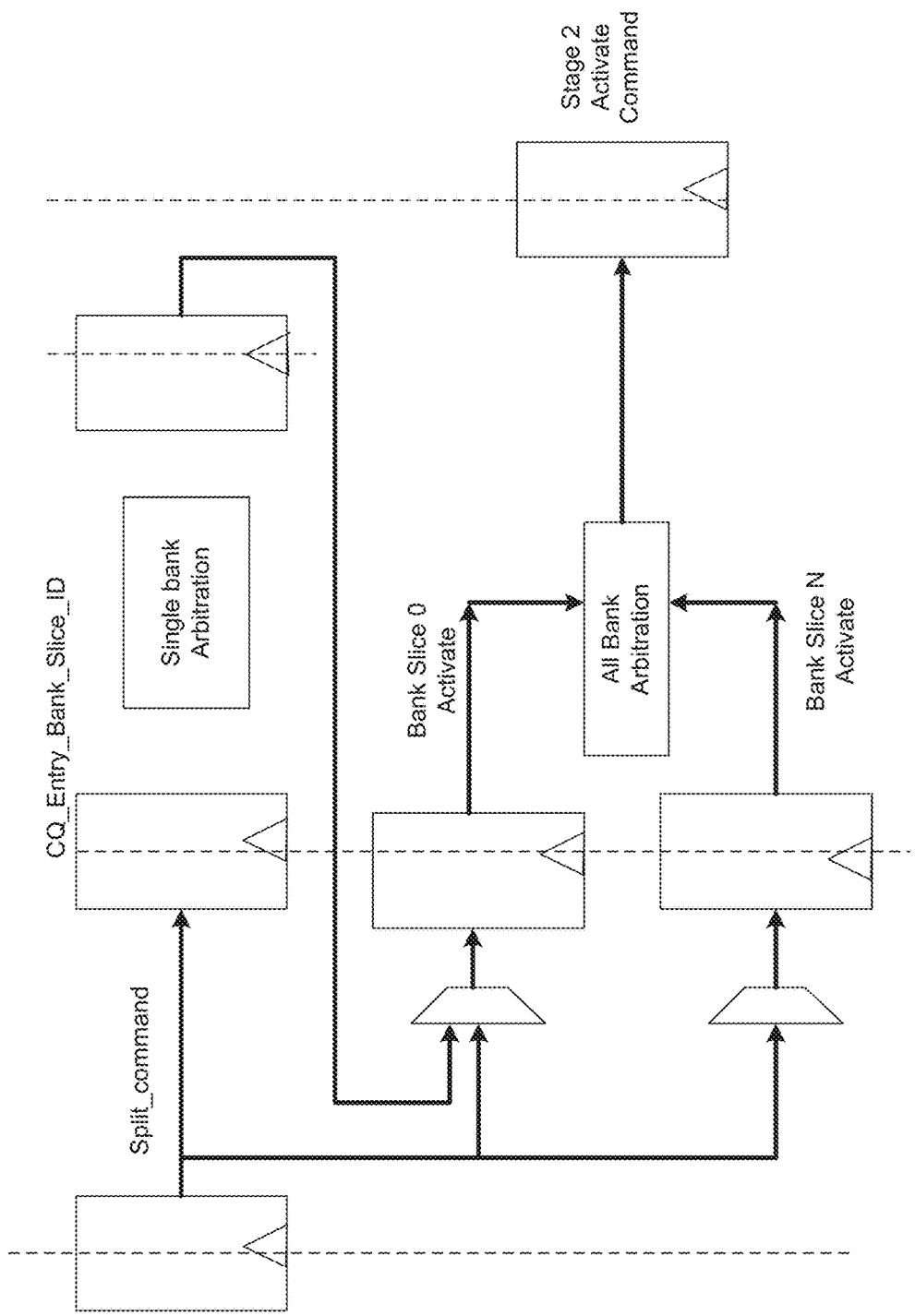
FIG. 10 is a diagram showing pipeline stages associated with a storage process according to an embodiment of the present disclosure.
Figure 11:
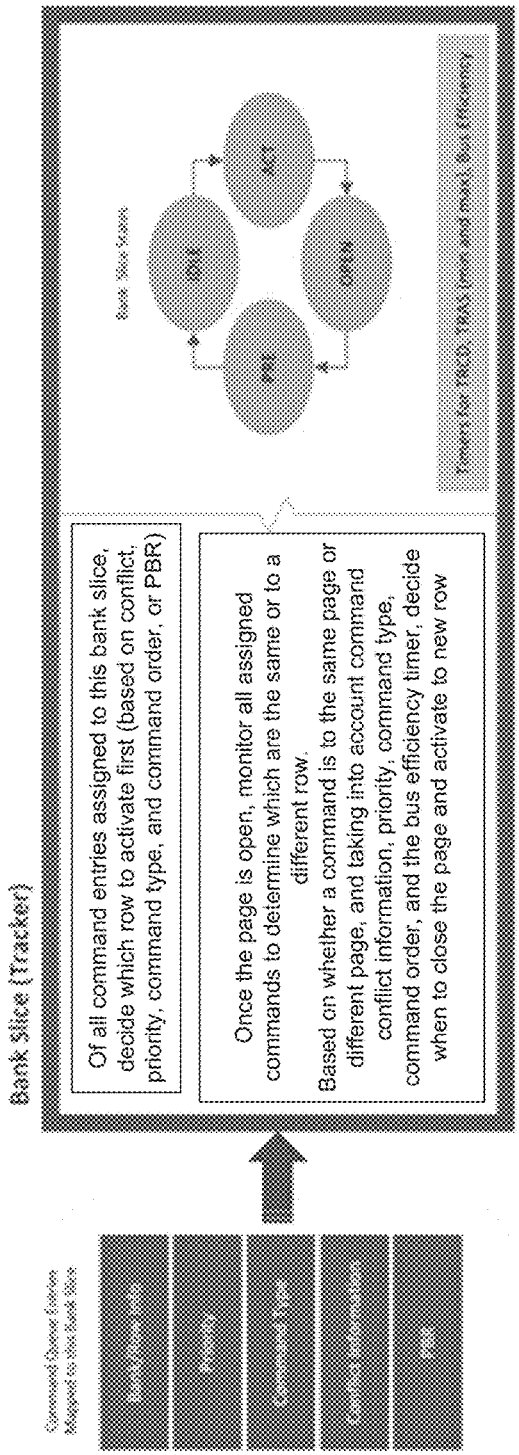
FIG. 11 is a diagram showing an example single bank arbitration pipeline associated with a storage process according to an embodiment of the present disclosure.
Figure 12:
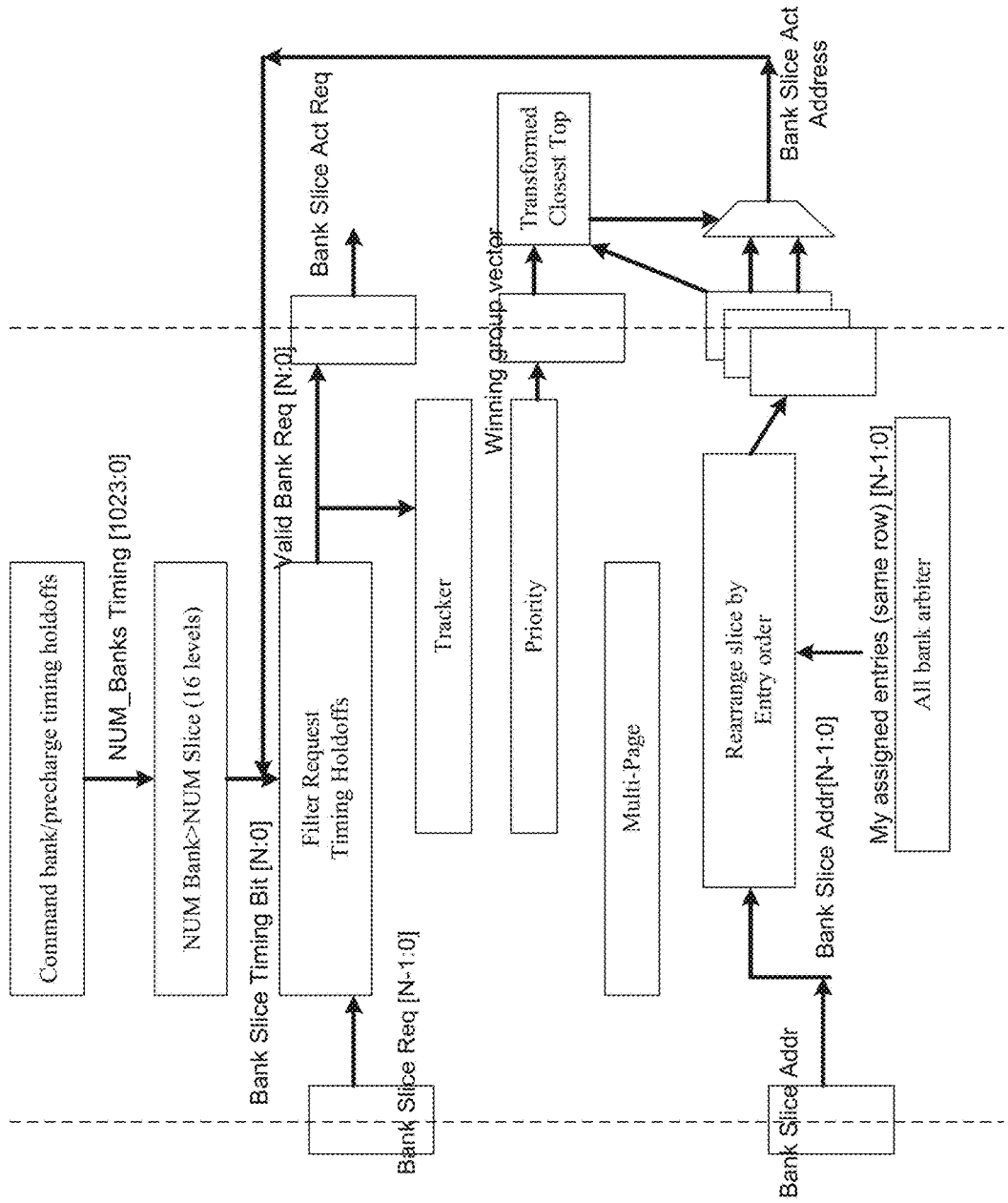
FIG. 12 is a diagram showing an example all bank arbitration pipeline associated with a storage process according to an embodiment of the present disclosure.

Referring now to FIGS. 10-12, examples showing various timing pipeline stages consistent with embodiments of storage process 10 are provided. FIG. 10 shows an example activating pipeline stages—split command valid. This particular example generally relates only to closing timing at a high frequency with pipelining and is provided merely by way of example. If the finite state machine is idle, unassigned, split command valid path to bank activate—2 cycles.

FIG. 11 shows an example of a single bank arbitration pipeline. Here, one additional cycle may be used to pick the winner (compared to split command valid)—Bank FSM account for this by delaying the activate command.

FIG. 11 shows an example depicting an embodiment of a bank slice (tracker). As shown in the Figure, one or more command queue entries may be mapped to a bank slice. The single bank arbiter may receive this information and of all of the command entries assigned to this bank slice, the process may decide which row to activate first (based on conflict, priority, command type, and command order or PBR). Once the page is open, the process may monitor all assigned commands to determine which are to the same or different row. Based on whether a command is to the same page or different page, and taking into account command conflict information, priority, command type, command order, and the bus efficiency timer, decide when to close the page and activate to a new row.

FIG. 12 shows an example of an all bank arbitration pipeline consistent with embodiments of storage process 10. In this particular example, the process may be configured to register the winning group vector select line. In this particular example, along the critical path, the command bank enable arrives late with the translate block (Num Banks>1 bit). A valid bank request arrives with only 80 ps remaining in the cycle. The winning group vector for precharge and activate require high power cells. The right portion of FIG. 12 depicts an example of address muxing (closest to the top). This example is provided merely for exemplary purposes and is not intended to limit the scope of the present disclosure.

Embodiments of storage process 10 may provide numerous advantages over existing approaches. Some of these may include, but are not limited to, pipelined interfaces to enable high speed operation, bank slices which can be assigned to any bank to enable less bank modules than banks in the system, a configurable number of bank slices to support customer defined maximum number of active banks, a single bank per command queue entry optimizes bank management, various bank command arbitration algorithms to prioritize bank operations based on bus efficiency, command ordering, command priority/QOS, and read/write grouping, on par performance with previous bank logic architecture It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A dynamic random access memory system comprising:
   a command queue that is configured to hold all commands that are currently selectable for bank operation and execution; and
   bank logic operatively connected with the command queue, wherein the bank logic includes a bank management module and a plurality of bank slices, wherein each of the plurality of bank slices is an independent, re-assignable bank tracking module.

2. The system of claim 1, wherein the plurality of bank slices is configurable to allow a number of trackable banks to be scaled up or down.

3. The system of claim 1, wherein a number of the plurality of bank slices is independent of a number of banks in a memory.

4. The system of claim 1, wherein a number of the plurality of bank slices is independent of a number of commands that can be currently executed in a memory controller.

5. The system of claim 1, further comprising:
a module configured to swap a page slice from a first bank to a second bank.

6. The system of claim 1, further comprising:
a module configured to swap one or more banks if more banks are requested than are available.

7. The system claim 1, further comprising:
a module configured to perform conflict resolution.

8. The system of claim 1, further comprising:
a module configured to address one or more page closures due to per bank refresh or pre-charge all.

9. The system claim 1, wherein the bank management module manages an allocation and de-allocation of the plurality of bank slices to the plurality of banks.

10. The system of claim 1, wherein the bank logic further includes an all bank arbiter configured to arbitrate between the plurality of bank slices to determine a command to be executed.

11. A method comprising:
storing one or more commands that are currently selectable for bank operation and execution in a command queue; and
accessing the command queue using bank logic operatively connected with the command queue, wherein the bank logic includes a bank management module and a plurality of bank slices, wherein each of the plurality of bank slices is an independent, re-assignable bank tracking module.

12. The method of claim 11, further comprising:
configuring the plurality of bank slices to allow a number of trackable banks to be scaled up or down.

13. The method of claim 11, wherein a number of the plurality of bank slices is independent of a number of banks in a memory.

14. The method of claim 11, wherein a number of the plurality of bank slices is independent of a number of commands that can be currently executed in a memory controller.

15. The method of claim 11, further comprising:
swapping a page slice from a first bank to a second bank.

16. The method of claim 11, further comprising:
swapping one or more banks if more banks are requested than are available.

17. The method claim 11, further comprising:
performing conflict resolution.

18. The method of claim 11, further comprising:
addressing one or more page closures due to per bank refresh or pre-charge all.

19. The method claim 11, further comprising:
managing, via the bank management module, an allocation and de-allocation of the plurality of bank slices to the plurality of banks.

20. The method of claim 11, further comprising:
arbitrating between the plurality of bank slices to determine a command to be executed using an all bank arbiter associated with the bank logic.

* * * * *